Oct. 20, 1942.   W. M. PERRY ET AL   2,299,721
MAGNESIA COMPOSITION AND METHOD OF PREPARING SAME
Filed June 29, 1939
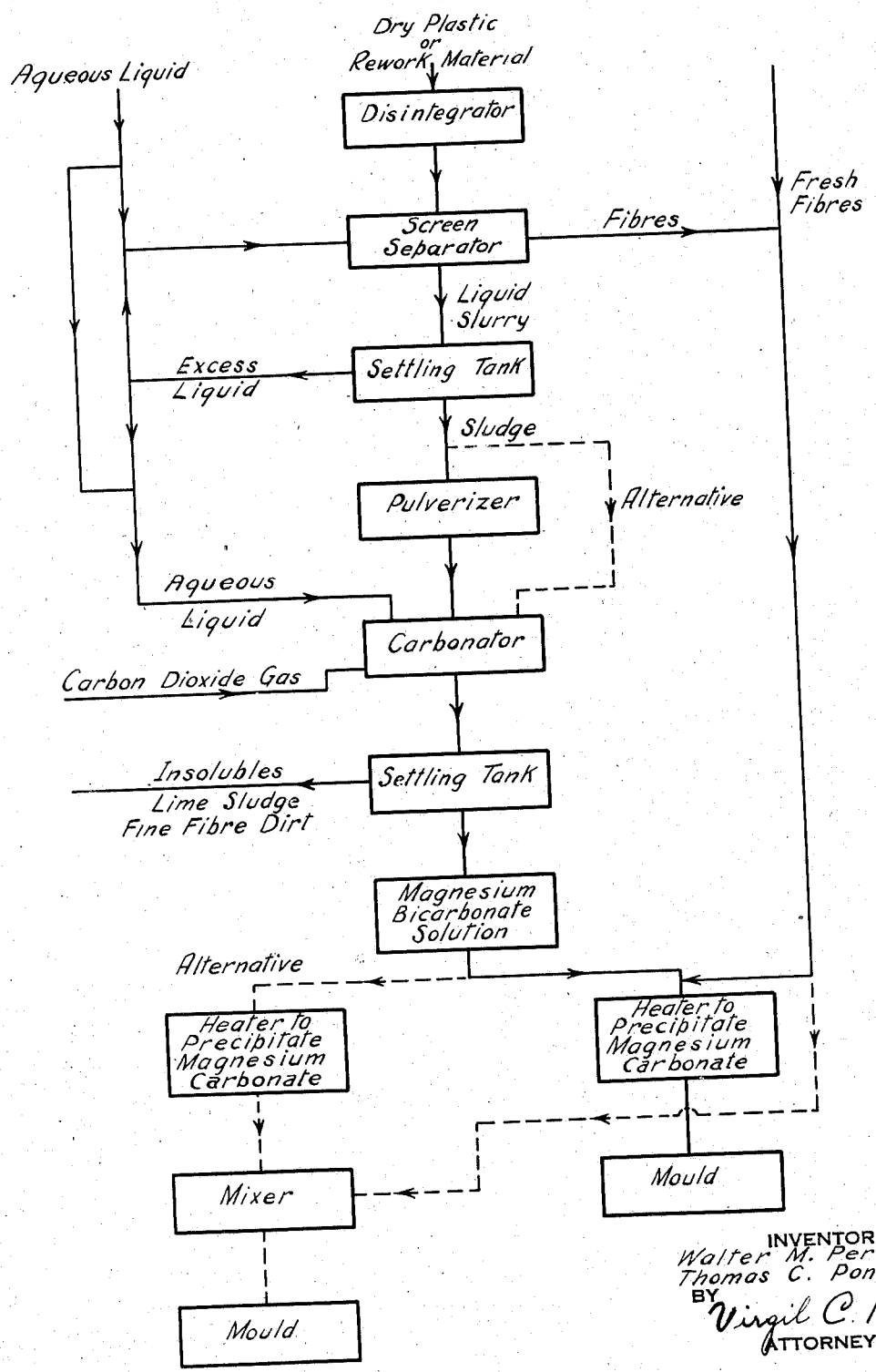

Patented Oct. 20, 1942

2,299,721

UNITED STATES PATENT OFFICE 2,299,721

MAGNESIA COMPOSITION AND METHOD OF PREPARING SAME

Walter M. Perry, North Plainfield, N. J., and Thomas C. Pond, Larchmont, N. Y., assignors to Johns-Manville Corporation, New York, N. Y., a corporation of New York Application June 29, 1939, Serial No. 281,854

11 Claims. (Cl. 106—121)

This invention relates to magnesium carbonate compositions of the type suitable for insulating purposes and particularly to magnesia products using ingredients obtained from plastic or rework material, which are relatively light in weight, as contrasted to magnesia products using plastic or rework material made by previously known methods. The invention pertains especially to the novel procedure of utilizing plastic or rework material generally referred to as "plastic" in which the plastic is subjected to a careful treatment in order to separate the desirable components from the components not desired in the final product.

Plastic or rework magnesia materials are obtained from waste and trimmings in the manufacture of magnesia products. These trimmings usually may vary in size, varying from large lumps to small particles and are composed of about 85% basic magnesium carbonate (generally referred to as 85% magnesia) and about 15% asbestos fibres. In order to avoid confusion in terminology, plastic or rework material obtained as waste or trimmings during the manufacture of magnesia products will be referred to as "plastic" in both the specification and claims and is herein specifically restricted to include only asbestos, magnesium carbonate compositions and other components obtained as described.

The question of plastics has always been a serious problem for magnesia insulation manufacturers, since, generally, large quantities of trimmings, waste, and small particles accumulate during the molding and finishing operation. It has been estimated that approximately 40 to 70% of the weight of the finished product accumulate as plastics, and the necessity of utilizing such large quantities of plastics including valuable ingredients in an economical manner will be readily apparent.

Heretofore, plastics have been crushed to a fine powder and added in the dry form to wet magnesia mixes from which magnesia insulation, pipes, and blocks are molded. It will be clear that accumulated dirt and other undesirable fines were thus added to the fresh stock and tended to increase the weight of the final magnesia product. Furthermore, it has been found that as plastic is crushed to a fine powder a large percentage of the long asbestos fibres are broken and become short fibres, which is undesirable since it has a tendency to increase the density of the finished product. In following known procedures the average density of magnesia products is approximately 14 to 16 lbs. per cu. ft.; whereas, in following the novel procedure described herein as my invention, the density of the final product is approximately 12 to 13 lbs. per cu. ft. without seriously decreasing the modulus of rupture.

It is, therefore, an object of my invention to utilize plastics obtained from trimming and waste material in the manufacture of light weight magnesia products in an economical manner which will materially aid in solving a long standing manufacturing problem. It is also an object of my invention to treat plastic material in such a manner that asbestos fibres, which have been reduced to an ineffective length in prior operation, will be removed. The ineffective fibres are undesirable in the finished product since they merely add weight without giving reinforcement or strength to the product. It is a further object to treat plastic trim and waste materials in such a manner that substantially all dirt, grit, and undesirable fines are removed from the product, which would normally increase the density of the final product as indicated above. A further object is to utilize and recover the magnesia from the tailing water obtained from the cages, which, under the present method, is lost and thereby increases the cost of production. A still further object is to apply the novel treatment to utilize a plastic material in such a manner that the average density of the finished product will be reduced from approximately 14 to 16 lbs. per cu. ft. to about 12 to 13 lbs. per cu. ft. without seriously decreasing the modulus of rupture. Still further objects and advantages will be apparent to those skilled in the art when applying and practicing the hereinafter discussed novel procedure.

Briefly stated, the present invention comprises the procedure of treating plastic material with an aqueous magnesia solution or water to form a slurry and then separating the fibrous asbestos material from the slurry. The slurry containing fines is then subjected to the action of carbon dioxide gas and the magnesium compounds will dissolve in the solution, leaving lime sludge, short fibres, grit, etc. as an insoluble sludge. The magnesium bicarbonate solution is then separated from the sludge and upon heating, basic magnesium carbonate crystals will be formed as a precipitate. Asbestos fibres may then be added before or after the heating step, which will tend to drive off the carbon dioxide gas to precipitate hydrated magnesium carbonate. The basic magnesium carbonate asbestos product is now molded and results in a very satisfactory light weight magnesia product.

The invention will be illustrated by a more complete description in connection with the attached drawing, which shows a flow sheet of the preferred embodiment of the method for producing the improved product.

In the specific application of the process to plant operations, the dry plastic is fed into a conventional disintegrating machine, which tends to crush the large lumps of plastic into smaller lumps in order that the plastic can be handled more conveniently. The small lumps are now conveyed to a screen separator of about 15 mesh, and an aqueous liquid, such as water or an aqueous solution containing dissolved magnesia derived from the cages, is sprayed upon the plastic materials passing through the screen. Any type of screen separating apparatus is satisfactory to be used in the present procedure, but a rotating screen has been found to give excellent results and is, therefore, preferred. If a rotating screen is used, the speed should be regulated so that the solution and the plastic lumps will be thoroughly agitated and broken. An approximate rotating speed of 20 R. P. M. is illustrative for satisfactory operation, although it is understood that any speed may conveniently be used. The aqueous liquid carrying the fines or slurry will pass through the openings in the screen and the fibrous asbestos material will thereby be separated from the solution.

The aqueous solution containing fines to the extent of about 1 or 2% is pumped to a conventional settling tank such as a Dorr thickener. At this point the fines will settle to the bottom of the tank and the excess clear solution is removed. The excess solution containing some dissolved magnesia may be returned to the screen separator to assist in further separation of the fibrous asbestos material from additional plastic material passing through the screen separator. On the other hand, if desired, the excess liquid may be pumped directly to the carbonating unit hereinafter described, or the excess liquid may be treated with lime to precipitate magnesium carbonate.

The sludge material, after passing through the settling tank, contains approximately 5 to 10% solids and the solids should be approximately 200 mesh or finer. If the average fineness of the sludge is finer than 200 mesh, the sludge may be pumped directly to the carbonating unit. If, however, the sludge is relatively coarser than 200 mesh, it is preferable and advantageous to pass the material through a pulverizing unit in order to reduce the size of the particles to a fineness smaller than 200 mesh. It is desirable to have the sludge particles as fine as possible in order that the largest possible surface area of the basic magnesium carbonate particles will be exposed to the action of the carbon dioxide gas bubbled through the solution in the carbonating unit. Any conventional pulverizing machine such as a ball mill or colloid mill which will reduce the size of the sludge particles to the desired mesh can be used.

The fluid-like fine sludge is pumped to a carbonating unit and diluted with water or an aqueous solution containing dissolved magnesium carbonate so that the solution contains about 2% solids, and carbon dioxide gas is then bubbled through the solution. The carbon dioxide gas will react with the magnesium carbonate fines to form the soluble magnesium bicarbonate. It has been found that the reaction continues most favorably at relatively low temperatures, approximately 80° F., although this temperature may be varied, depending upon the speed desired in the reaction between the carbon dioxide gas and the magnesium carbonate particles.

Lime, sludge, fine fibrous material, dirt, etc. will remain suspended or settle as solids in the magnesium bicarbonate solution.

The magnesium bicarbonate solution containing the insoluble fineness is then pumped to a settling tank such as a Dorr thickener or any other conventional settling tank. It is desirable to avoid high temperatures to prevent the decomposition of the magnesium bicarbonate solution. As an illustration, satisfactory results are obtained if the temperature in the unit is held at approximately 85 to 95° F. The insoluble fines including the lime sludge, fine fibres, etc. are allowed to settle to the bottom of the tank and the magnesium bicarbonate solution will be substantially clear.

The clear magnesium bicarbonate solution is removed from the settling tank and pumped to a mixing unit. At this point asbestos fibres are mixed with the solution. The asbestos fibres may be wholly reclaimed fibres obtained in the present process at the screen separator or it may be a mixture of fresh stock fibres and reclaimed fibres or it may be entirely fresh stock fibres. The solution is then heated and the basic magnesium carbonate crystals will precipitate from the solution. Any convenient temperature may be used at which precipitation of the hydrated magnesium carbonate proceeds satisfactorily. Satisfactory results have been obtained when the magnesium bicarbonate solution was heated to about 200° F. or 212° F. The precipitated crystals are uniformly dispersed throughout the asbestos fibres, since the basic magnesium carbonate is caused to precipitate while the solution is being agitated and the fibres are uniformly distributed throughout the solution. The prepared mixture is now pressed into molds of any preferred shape. After shaping, the product is removed from the molds and allowed to dry. The above procedure of precipitation in the presence of the fibres is fully described in the U. S. patent to Seigle, 1,982,542.

The procedure of adding the fibres to the magnesium bicarbonate solution, as described above, may be modified in that the magnesium bicarbonate solution may be heated and the basic magnesium bicarbonate crystals precipitated from the solution. The asbestos fibres may then be added after the hydrated magnesium carbonate has been precipitated. Following the precipitation of the magnesium carbonate, the mixture is agitated to obtain uniform distribution of the precipitated carbonate throughout the asbestos fibres. After thorough mixing, the mixture is pressed into molds in the same manner as described above. The material is then taken from the molds and allowed to dry.

The following table will disclose the distinct advantages of using the procedure described above as compared to the procedure heretofore followed.

|  | Density per cu. ft. | Modulus of rupture |
|---|---|---|
|  | Pounds | (Lbs. per sq. in.) |
| No plastic | 12 | 60 |
| 25% | 13.5 | 60 to 70 |
| 33% | 14 | 70 to 75 |
| All plastic | 18 | 70 to 75 |

In studying the above table it will be clear that if the plastic material is separated into the separate components, namely, the asbestos fibres and magnesium carbonate as outlined above, the density per cu. ft. of the finished product will be relatively low. In the products in which pulverized dry mixed plastic has been added to the magnesia compositions, it will be noted that the relative density increased as the percentage of dry plastic added to the mixture increased. Through the method of following the novel combination of steps to separate the plastic materials into its individual components, that is, magnesium carbonate and asbestos fibres, the resulting products will be no denser than if the same product had been prepared from fresh stock of magnesium carbonate and asbestos fibres.

It will be understood that the details given are for the purpose of illustration, not restriction, and that variations within the spirit of the invention are to be included in the scope of the appended claims.

What we claim is:

1. The process of preparing a magnesia composition suitable for use in the manufacture of molded magnesia products including reclaimed magnesium carbonate and fibres derived from a plastic which comprises treating the plastic with an aqueous liquid to form a slurry, separating fibrous ingredients from the slurry, subjecting the slurry to the action of a gas to dissolve soluble magnesium products to form a magnesium bicarbonate solution, separating insoluble fines from the magnesium solution, and then heating the magnesium solution to precipitate hydrated magnesium carbonate.

2. The process of preparing a magnesia composition suitable for use in the manufacture of molded magnesia products including reclaimed magnesium carbonate and fibres derived from a plastic which comprises treating the plastic with an aqueous liquid to form a slurry, separating fibrous ingredients from the slurry, subjecting the slurry to the action of carbon dioxide gas to dissolve soluble magnesium products to form a magnesium bicarbonate solution, separating insoluble fines from the magnesium solution, and then heating the magnesium solution to precipitate hydrated magnesium carbonate.

3. The process of preparing a magnesia composition suitable for use in the manufacture of molded magnesia products including reclaimed magnesium carbonate and fibres derived from a plastic which comprises treating the plastic with an aqueous liquid to form a slurry, separating fibrous ingredients from the slurry, subjecting the slurry to the action of a gas to dissolve soluble magnesium products to form a magnesium bicarbonate solution, separating insoluble fines from the magnesium solution, then adding fibrous material to the solution, and heating the solution to precipitate hydrated magnesium carbonate to form a mixture suitable for molding.

4. The process of preparing a magnesia composition suitable for use in the manufacture of molded magnesia products including reclaimed magnesium carbonate and fibres derived from a plastic which comprises treating the plastic with an aqueous liquid to form a slurry, separating fibrous ingredients from the slurry, subjecting the slurry to the action of a gas to dissolve soluble magnesium products to form a magnesium bicarbonate solution, separating insoluble fines from the magnesium solution, heating the solution to precipitate hydrated magnesium carbonate, and then adding fibrous material to the solution containing the precipitated magnesium carbonate to form a mixture suitable for molding.

5. The process of preparing a magnesia mixture adapted to be used in the manufacture of molded magnesia products including reclaimed magnesium carbonate and fibres derived from disintegrated plastic, which comprises treating the plastic with an aqueous liquid to form a slurry and simultaneously passing the slurry through a separating means to separate fibrous ingredients from the fine components suspended in the aqueous liquid, subjecting the suspended fine components to the action of a gas to dissolve soluble magnesium products to form a magnesium bicarbonate solution and separating the insoluble fines from the solution, then adding fibrous material to the solution and heating the solution to precipitate hydrated magnesium carbonate to form a homogeneous mixture suitable for molding.

6. The process of preparing a magnesia mixture adapted to be used in the manufacture of molded magnesia products including reclaimed magnesium carbonate and fibres derived from disintegrated plastic, which comprises treating the plastic with an aqueous liquid to form a slurry and simultaneously passing the slurry through a separating means to separate fibrous ingredients from fine components suspended in the aqueous liquid, subjecting the suspended fine components to the action of a gas to dissolve soluble magnesium products to form a magnesium bicarbonate solution and separating the insoluble fines from the solution, then adding fibrous material including said previously separated fibrous material to the solution and heating the solution to precipitate hydrated magnesium carbonate to form a homogeneous mixture suitable for molding.

7. The process of preparing a magnesia mixture adapted to be used in the manufacture of molded magnesia products including reclaimed magnesium carbonate and fibres derived from a plastic, which comprises treating the plastic with an aqueous liquid to form a slurry and simultaneously passing the slurry through a rotating screen, separating fibrous ingredients from fine components suspended in the slurry, subjecting the suspended fine components to the action of carbon dioxide gas to dissolve soluble magnesium products to form a magnesium bicarbonate solution and separating the insoluble fines from the solution, then adding fibrous material to the solution and heating the solution to precipitate hydrated magnesium carbonate to form a homogeneous mixure suitable for molding.

8. The process of preparing a magnesia mixture adapted to be used in the manufacture of molded magnesia products including reclaimed magnesium carbonate and fibres derived from a plastic, which comprises treating the plastic with an aqueous liquid to form a slurry, passing the slurry through a rotating screen and simultaneously treating the slurry with additional aqueous liquid thereby separating fibrous ingredients from fine components suspended in the liquid, subjecting the suspended fine components to the action of carbon dioxide gas to dissolve soluble magnesium products to form a magnesium bicarbonate solution and separating the insoluble fines from the solution, then adding fibrous material to the solution and heating the solution to precipitate hydrated magnesium carbonate to form a homogeneous mixture suitable for molding.

9. The process of preparing a magnesia composition suitable for use in the manufacture of molded magnesia products including reclaimed magnesium carbonate and fibers derived from a plastic, which comprises disintegrating and treating the plastic with an excess quantity of an aqueous liquid to form a slurry and simultaneously passing the slurry over a separating means to separate fibrous material therefrom, collecting the slurry in a container and following the settling of the suspended sludge withdrawing a substantial quantity of the aqueous liquid, then passing the sludge through a pulverizing means followed by further dilution of the pulverized sludge with an additional quantity of an aqueous liquid, subjecting the aqueous liquid sludge to the action of carbon dioxide gas to dissolve soluble magnesium products to form a magnesium bicarbonate solution and separating the insoluble materials therefrom, and thereafter heating the solution to precipitate hydrated magnesium carbonate.

10. The process of preparing a magnesia composition suitable for use in the manufacture of molded magnesia products including reclaimed magnesium carbonate and fibres derived from a plastic, which comprises disintegrating and treating the plastic with an excess quantity of an aqueous liquid to form a slurry and simultaneously passing the slurry over a separating means to separate fibrous material therefrom, collecting the slurry in a container and following the settling of the suspended sludge withdrawing a substantial quantity of the aqueous liquid, then passing the sludge through a pulverizing means followed by further dilution of the pulverized sludge with an additional quantity of an aqueous liquid, subjecting the aqueous liquid sludge to the action of carbon dioxide gas to dissolve soluble magnesium products to form a magnesium bicarbonate solution and separating the insoluble materials therefrom, adding asbestos fibres to the magnesium bicarbonate solution, and thereafter heating the solution to precipitate hydrated magnesium carbonate.

11. The process of preparing a magnesia composition suitable for use in the manufacture of molded magnesia products including reclaimed magnesium carbonate and fibres derived from a plastic, which comprises disintegrating and treating the plastic with an excess quantity of an aqueous liquid to form a slurry and simultaneously passing the slurry over a separating means to separate fibrous material therefrom, collecting the slurry in a container and following the settling of the suspended sludge withdrawing a substantial quantity of the aqueous liquid, then passing the sludge through a pulverizing means followed by further dilution of the pulverized sludge with an additional quantity of an aqueous liquid, subjecting the aqueous liquid sludge to the action of carbon dioxide gas to dissolve soluble magnesium products to form a magnesium bicarbonate solution and separating the insoluble materials therefrom, heating the solution to precipitate hydrated magnesium carbonate, and thereafter adding asbestos fibres and mixing the magnesium carbonate and the fibres.

WALTER M. PERRY.
THOMAS C. POND.